United States Patent
Putnam

[11] Patent Number: 5,513,869
[45] Date of Patent: May 7, 1996

[54] FIFTH WHEEL WITH GOOSENECK

[76] Inventor: Rex D. Putnam, 239 Sherman St., Bronson, Mich. 49028

[21] Appl. No.: 355,483

[22] Filed: Dec. 14, 1994

[51] Int. Cl.$^6$ ..................................................... B60D 1/52
[52] U.S. Cl. ..................... 280/415.1; 280/417.1; 280/423.1; 280/511; 280/901
[58] Field of Search .................... 280/415.1, 417.1, 280/418.1, 423.1, 495, 511, 512, 901

[56] References Cited

U.S. PATENT DOCUMENTS

| | | | |
|---|---|---|---|
| Re. 16,109 | 7/1925 | De Mattia | 280/437 |
| 2,416,502 | 2/1947 | Thompson | 280/511 |
| 2,784,009 | 3/1957 | Braunberger | 280/440 |
| 3,650,546 | 3/1972 | Koenig | 280/423.1 |
| 3,659,876 | 5/1972 | Melton | 280/423.1 |
| 3,796,444 | 3/1974 | Hixon | 280/423.1 |
| 3,820,821 | 6/1974 | Leland | 280/423.1 |
| 3,941,407 | 3/1976 | Breford | 280/416.1 |
| 4,176,853 | 12/1979 | Brock | 280/423.1 |
| 4,527,935 | 7/1985 | Fortenberry | 280/415.1 |
| 4,699,395 | 10/1987 | Hale | 280/423.1 |
| 5,143,393 | 9/1992 | Meyer | 280/491.1 |
| 5,344,172 | 9/1994 | Jaun | 280/415.1 |

*Primary Examiner*—Mitchell J. Hill
*Attorney, Agent, or Firm*—Ian C. McLeod

[57] ABSTRACT

A fifth wheel hitch assembly (10) which is mounted on the hitch ball (32) of a gooseneck subassembly (12), is described. The subassembly is mounted in the bed (14A) of a pickup truck (14) such that the subassembly is parallel to the rear axle (16) of the truck and the hitch ball is directly centered over or slightly fore or aft of the axle differential housing (58). A pair of flexible half-shell bearings (39) are positioned on the hitch ball to form a complete bearing (38) completely surrounding the top portion (33) of the hitch ball. A fifth wheel hitch assembly with a permanently mounted adaptor (42) is mounted with the adaptor extending over the complete bearing when the complete bearing is positioned on the hitch ball. A pair of securing rods (52) extend through the adaptor and the complete bearing below the ball (33A) of the top portion of the hitch ball and securing the adaptor on the complete bearing and the hitch ball. The fifth wheel head (46) of the fifth wheel hitch assembly is mounted onto the open top of the adaptor.

36 Claims, 5 Drawing Sheets

FIFTH WHEEL WITH GOOSENECK

BACKGROUND OF THE INVENTION

(1) Field of the Invention

The present invention relates to a fifth wheel hitch assembly for mounting on a vehicle. In particular, the present invention relates to a fifth wheel hitch assembly in which the fifth wheel head has an adaptor which enables the hitch assembly to be mounted on the hitch ball of a gooseneck subassembly. A complete flexible bearing is provided around the hitch ball to allow flexible, frictionless mounting of the fifth wheel hitch on the gooseneck subassembly. The mounting of the fifth wheel hitch on the gooseneck subassembly allows the fifth wheel hitch assembly to have a range of movement similar to a ball and socket joint. The ability of the fifth wheel hitch assembly to tilt in any direction allows ease of engagement of the fifth wheel trailer which enables a user to easily couple or uncouple the trailer being towed even when the trailer is situated on an uneven ground surface.

(2) Prior Art

The prior art has shown various types of fifth wheel hitch assemblies and gooseneck hitch assemblies. Illustrative are U.S. Pat. Nos. Re 16,109 to Mattia; 2,416,502 to Thompson; 2,784,009 to Braunberger; 3,820,821 to Leland; 3,941,407 to Breford; 4,527,935 to Fortenberry and 5,143,393 to Meyer. However, a common problem with prior art hitch assemblies is that the hitch connections become bound up or jammed when the trailer being towed is placed on an uneven ground surface. This makes coupling and uncoupling of the hitches very difficult. Therefore, there remains a need for a fifth wheel assembly which is capable of being mounted on the hitch ball of a gooseneck subassembly and which is easily coupled or uncoupled to the trailer even when the trailer is positioned on an uneven surface.

OBJECTS

It is an object of the present invention to provide a fifth wheel hitch assembly which combines the virtues of a fifth wheel assembly and a gooseneck assembly in a single assembly. Further, it is an object of the present invention to provide a fifth wheel hitch assembly which is mounted on the hitch ball of a gooseneck subassembly. Still further, it is an object of the present invention to provide a fifth wheel hitch assembly having a bearing which provides a shock absorbing (cushioning) action to the fifth wheel assembly. Further, it is an object of the present invention to provide a method of mounting a fifth wheel hitch assembly on a gooseneck subassembly which is mounted in the bed of a pickup truck. Still further, it is an object of the present invention to provide a fifth wheel hitch assembly which has a complete bearing for encasing the hitch ball to provide a movable and reduced friction mounting of the fifth wheel assembly on the hitch ball of the gooseneck subassembly. Still further, it is an object of the present invention to provide a fifth wheel hitch assembly which remains in an upright position when not in use and returns to this position after usage. Furthermore, it is an object of the present invention to provide a fifth wheel hitch assembly which is easily manufactured by simple modification of a standard fifth wheel hitch. Further, it is an object of the present invention to provide a system which is easily convertible from a gooseneck to a fifth wheel and back again. Finally, it is an object of the present invention to provide a fifth wheel hitch assembly which is easy to mount on the hitch ball of a gooseneck subassembly. These and other objects will become increasingly apparent by reference to the following description and the drawings.

DETAILED DESCRIPTION OF THE PREFERRED EMBODIMENTS

The present invention relates to an apparatus for providing a fifth wheel hitch connection with a hitch ball, which comprises: a pair of half-shell bearings each having a concave indention mountable on and conforming to the hitch ball wherein the concave indentions are positioned together to form a complete cavity for holding the hitch ball when the half-shell bearings are positioned together around the hitch ball and having outer walls around the cavity; an adaptor having an opening which is mounted on the outer walls of the bearings so that the bearings are secured on the hitch ball wherein the bearings provide for mounting of the adaptor on the hitch ball; securing means for securing the adaptor on the bearings when mounted on the hitch ball; and a fifth wheel hitch assembly mounted on an end of the adaptor mountable above the cavity and above the hitch ball.

Further, the present invention relates to an apparatus for providing a fifth wheel hitch connection on a vehicle, which comprises: a hitch bar having a hitch ball mountable on the vehicle; a pair of half-shell bearings each having a concave indention mountable on and conforming to the hitch ball wherein the concave indentions are positioned together to form a complete cavity for holding the hitch ball when the half-shell bearings are positioned together around the hitch ball and having outer walls around the cavity; an adaptor having an opening which is mounted on the outer walls of the bearings so that the bearings are secured on the hitch ball wherein the bearings provide for mounting of the adaptor on the hitch ball; securing means for securing the adaptor on the bearings when mounted on the hitch ball; and a fifth wheel hitch assembly mounted on an end of the adaptor mountable above the cavity and above the hitch ball.

Still further, the present invention relates to a method for providing a fifth wheel hitch connection on a hitch ball mounted on a vehicle, which comprises: mounting a pair of resilient half-shell bearings on the hitch ball each shell having a concave indention conforming to the hitch ball, wherein the concave indentions are positioned together to form a complete cavity for holding the hitch ball when the half-shell bearings are moved together around the hitch ball and having outer walls around the opening; mounting an adaptor having an opening which is mounted on the outer walls of the bearings so that the bearings are secured on the hitch ball wherein the bearings provide for mounting of the adaptor on the hitch ball; and securing the adaptor on the bearings and the hitch ball.

Furthermore, the present invention relates to a method for mounting a fifth wheel hitch on a vehicle, which comprises: mounting a hitch bar means having a hitch ball on the vehicle; mounting a pair of half-shell bearings on the hitch ball each shell having a concave indention conforming to the hitch ball, wherein the concave indentions are positioned together to form a complete cavity for holding the hitch ball when the half-shell bearings are moved together around the hitch ball and having outer walls around the cavity; mounting an adaptor having an opening which is mounted on the outer walls of the bearings so that the bearings are secured on the hitch ball wherein the bearings provide for mounting of the adaptor on the hitch ball; and securing the adaptor on the bearings and the hitch ball.

Still further, the present invention relates to an apparatus for providing a fifth wheel hitch connection with a hitch ball, which comprises: shell bearings each having a concave indention mountable on and conforming to the hitch ball wherein the concave indentions are positioned together to form a complete cavity for holding the hitch ball when the shell bearings are positioned together around the hitch ball and having outer walls around the cavity; an adaptor having an opening which is mounted on the outer walls of the bearings so that the bearings are secured on the hitch ball wherein the bearings provide for mounting of the adaptor on the hitch ball; securing means for securing the adaptor on the bearings when mounted on the hitch ball; and a fifth wheel hitch mounted on an end of the adaptor above the cavity and above the hitch ball.

Further, the present invention relates to a method for providing a fifth wheel hitch connection on a hitch ball mounted on a vehicle, which comprises: mounting resilient shell bearings on the hitch ball each bearing having a concave indention conforming to the hitch ball, wherein the concave indentions are positioned together to form a complete cavity for holding the hitch ball when the shell bearings are moved together around the hitch ball and having outer walls around the opening; mounting a fifth wheel hitch with an adaptor having an opening on the outer walls of the bearings so that the bearings are secured on the hitch ball wherein the bearings provide for mounting of the adaptor and fifth wheel hitch on the hitch ball; and securing the adaptor on the bearings and the hitch ball.

Finally, the present invention relates to a combination gooseneck and fifth wheel hitch connection, which comprises: a gooseneck subassembly having opposed ends with a hitch ball mounted between the opposed ends of the subassembly; a pair of half-shell bearings each having a concave indention mountable on and conforming to the hitch ball wherein the concave indentions are positioned together to form a complete cavity for holding the hitch ball when the half-shell bearings are positioned together around the hitch ball and having outer walls around the cavity; an adaptor having an opening which is mounted on the outer walls of the bearings so that the bearings are secured on the hitch ball wherein the bearings provide for mounting of the adaptor on the hitch ball; securing means for securing the adaptor on the bearings when mounted on the hitch ball; and a fifth wheel hitch assembly mounted on an end of the adaptor above the cavity and above the hitch ball.

The subassembly is mounted in the bed of a pickup truck parallel to or slightly forward of the rear axle of the pickup truck. The hitch ball is mounted in the center of the subassembly such that the vertical axis of the hitch ball is aligned with and either concentric with or spaced slightly forward of the vertical axis of the rear axle differential housing of the rear axle of the truck. The bearings are constructed of polyurethane and have a rectangular shape and can be constructed of several sections.

Figure 1:
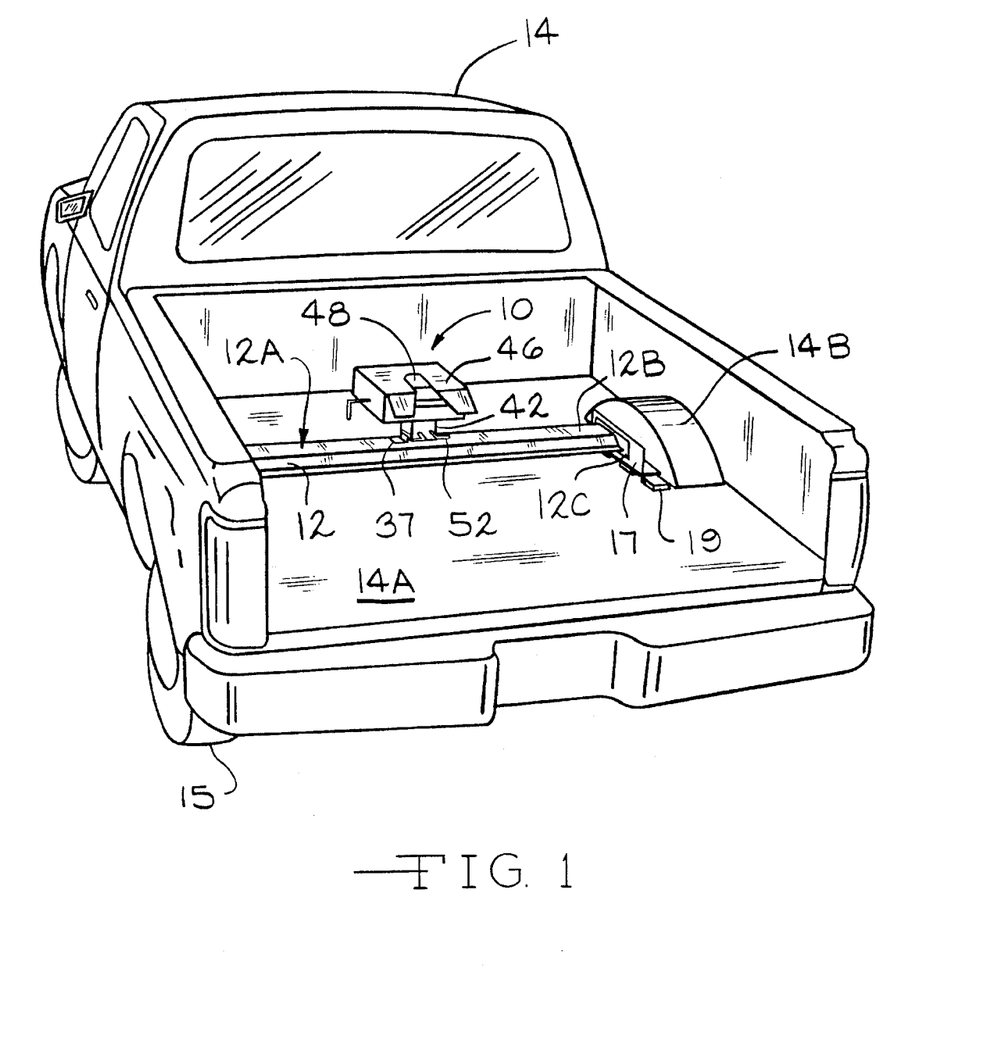
FIG. 1 is a perspective view of the fifth wheel hitch assembly 10 mounted on the gooseneck subassembly 12 which is mounted in the bed 14A of the pickup truck 14.

FIGS. 1 to 4 show the fifth wheel hitch assembly 10 of the present invention. The fifth wheel hitch assembly 10 includes a fifth wheel head 46 having an adaptor 42, a complete bearing 38 and a pair of securing rods 52. The fifth wheel hitch assembly 10 is to be preferably mounted on a hitch ball 32 of a gooseneck subassembly 12 mounted in the bed 14A of a pickup truck 14 (FIG. 1).

Figure 2:
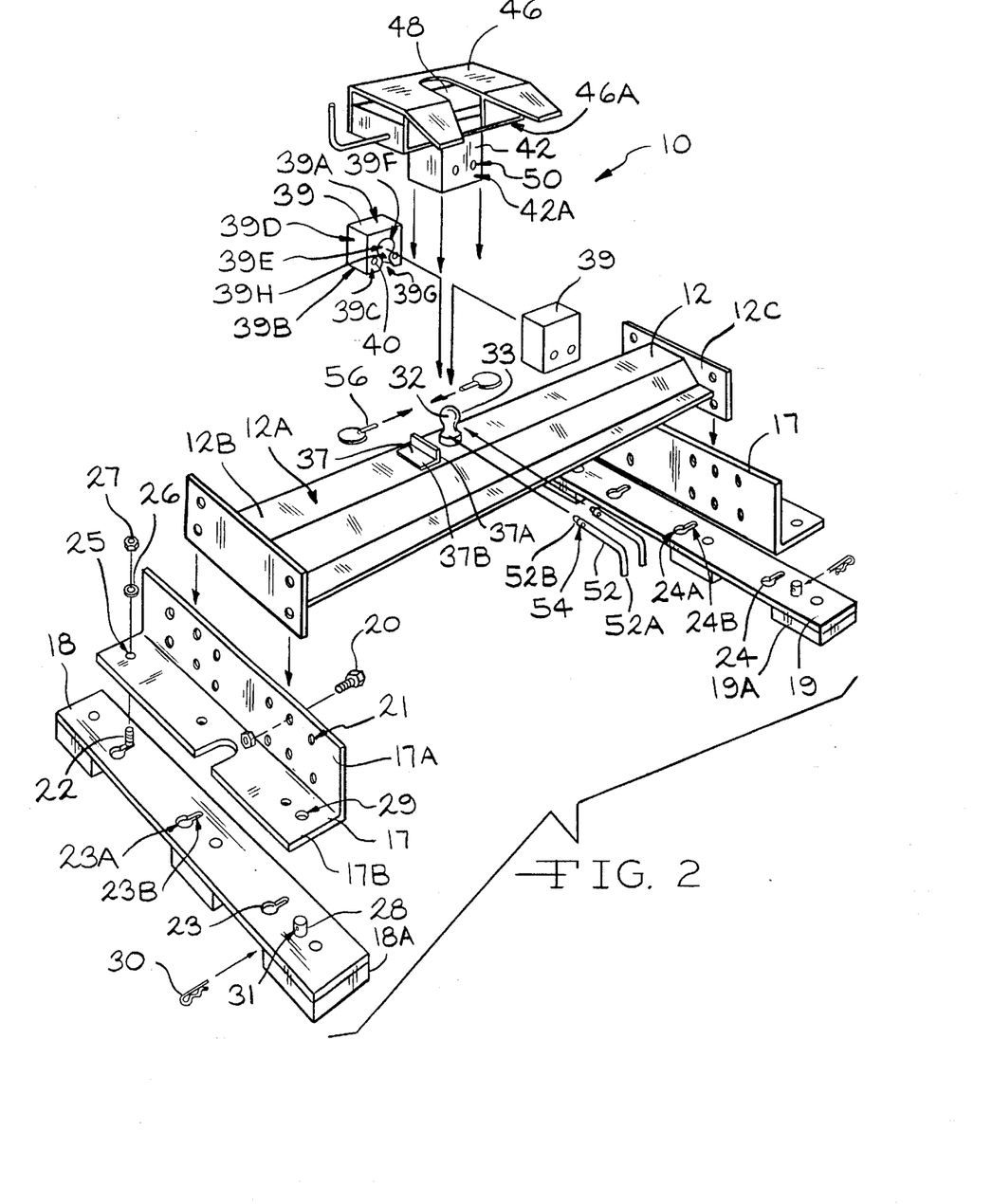
FIG. 2 is an exploded perspective view of the fifth wheel hitch assembly 10 and the gooseneck subassembly 12 showing the fifth wheel head 46 mounted on the adaptor 42, the pair of half-shell bearings 39, the securing rods 52 and the hairpin keepers 56.
Figures 3, 4:
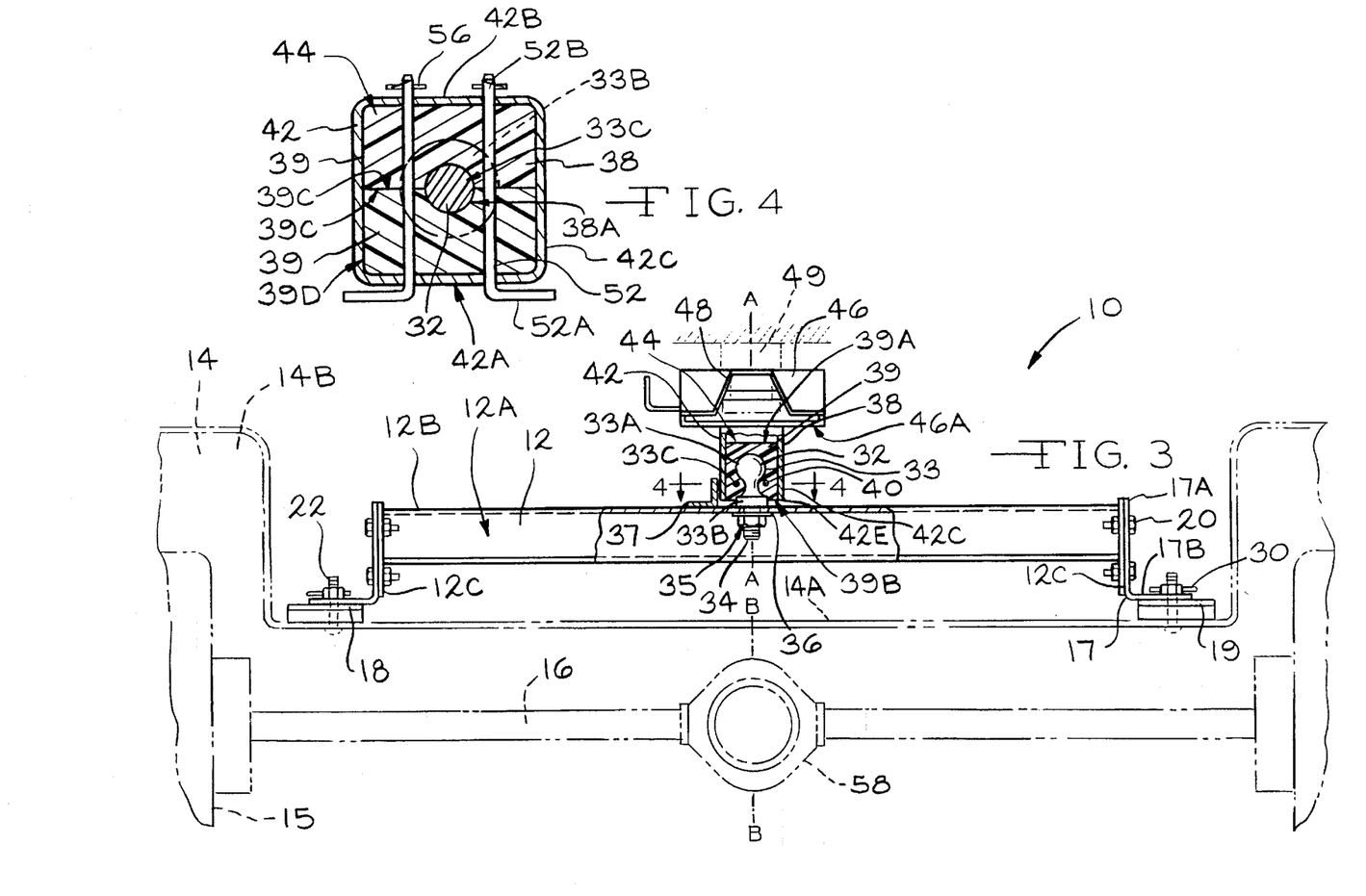
FIG. 3 is a front view of the fifth wheel hitch assembly 10 mounted on the hitch ball 32 of the gooseneck subassembly 12 showing a cross-section of the adaptor 42 on the half-shell bearings 39 encasing the hitch ball 32 mounted directly over the axle differential housing 58 of the rear axle 16.
FIG. 4 is an enlarged cross-section top view of the adaptor 42, the complete bearing 38, the hitch ball 32 and the securing rods 52.

The gooseneck subassembly 12 preferably has a rectangular shape with a top surface 12A extending between spaced apart opposed ends 12B. In the preferred embodiment, the subassembly 12 is mounted in the bed 14A of the pickup truck 14 such that the opposed ends 12B of the subassembly 12 are mounted adjacent to each of the rear wheel wells 14B (one shown) of the rear wheels 15 (one shown) of the truck 14 and the subassembly 12 is spaced above the bed 14A of the truck 14. Preferably, when mounted on the pickup truck 14, the gooseneck subassembly 12 extends parallel to and directly above the rear axle 16 of the truck 14 (FIG. 3). Alternately, the subassembly 12 is mounted slightly forward of and parallel to the rear axle 16 of the truck 14. As shown in FIG. 2, end plates 12C are mounted on the ends 12B of the subassembly 12 and are secured onto L-shaped attachment brackets 17. The attachment brackets 17 are removably mounted to securing plates 18 and 19. The securing plates 18 and 19 are mounted in the bed 14A of the truck 14 adjacent each of the rear wheel wells 14B and preferably are provided with spacers 18A and 19A adjacent the truck 14 which space the securing plates 18 and 19 above the bed 14A of the truck 14 to allow for insertion of the carriage bolts 22 (to be described in detail hereinafter). In the preferred embodiment, there are three (3) spacers 18A and 19A for each securing plate 18 and 19. The spacers 18A and 19A are preferably positioned adjacent each end of the securing plates 18 and 19 and in the center of the securing plates 18 and 19. The spacers 18A and 19A are positioned such as to not block the keyhole slots 23 and 24 (to be described in detail hereinafter) of the securing plates 18 and 19. The end plates 12C of the subassembly 12 are secured to the attachment brackets 17 by nut and bolt pairs 20 which are mounted through mounting holes 21 in a first leg 17A of the attachment brackets 17. The attachment brackets 17 have several sets of mounting holes 21 which allow the gooseneck subassembly 12 to be easily adjusted fore and aft of the rear axle 16 of the pickup truck 14 (FIGS. 2 and 3). The attachment brackets 17 are removably secured to the securing plates 18 and 19 by carriage bolts 22. In the preferred embodiment, there are three (3) carriage bolts 22 in each of the securing plates 18 and 19. The carriage bolts 22 are mounted through keyhole slots 23 and 24 in the securing plates 18 and 19. To mount the bolts 22 in the securing plates 18 and 19, the heads (not shown) of the carriage bolts 22 are inserted into the hole portions 23A and 24A of the keyhole slots 23 and 24 and then the bolts 22 are slid into the slots 23B and 24B to prevent removal of the carriage bolts 22. To mount the subassembly 12 onto the securing plates 18 and 19, the subassembly 12 is positioned in the truck 14 such that the holes 25 in the second legs 17B of the attachment brackets 17 are directly over and in line with the carriage bolts 22. The subassembly 12 is then moved into place on the carriage bolts 22 in the securing plates 18 and 19 and a lock washer 26 and nut 27 are placed on each of the carriage bolts 22 adjacent the second legs 17B of the attachment brackets 17. In addition, a mounting stud 28 is located on each of the securing plates 18 and 19 adjacent one end of the securing plates 18 and 19. The studs 28 extend upward similarly to the carriage bolts 22 and extend through apertures 29 in the second legs 17B of the attachment brackets 17 when the subassembly 12 is correctly positioned on the securing plates 18 and 19. Once the subassembly 12 is in place, hairpin keepers 30 are extended through apertures 31 in the studs 28. Thus, the studs 28 with the hairpin keepers 30 assist the carriage bolts 22 in securing the subassembly 12 onto the securing plates 18 and 19. If necessary, additional studs (not shown) and hairpin keepers (not shown) can be used to further secure the subassembly 12 onto the securing plates 18 and 19.

In an alternate method (not shown) of mounting the subassembly 12 in the truck 14, each of the carriage bolts 22 is mounted in the attachment brackets 17 with the heads of the carriage bolts 22 extending downward from the second leg 17B of the attachment brackets 17. The keyhole slots 23 and 24 in the securing plates 18 and 19 are positioned such that slots 23B and 24B of each of the keyhole slots 23 and 24 point in the same direction. Thus, installation and removal of the gooseneck subassembly 12 is easily accomplished by simply aligning the carriage bolt heads with the hole portions 23A and 24A of the keyhole slots 23 and 24, positioning the entire gooseneck subassembly 12 in place on the securing plates 18 and 19 and sliding the subassembly 12 toward one side of the truck 14 such that the carriage bolts 22 are moved into the slots 23B and 24B of the keyhole slots 23 and 24 of the securing plates 18 and 19. The nuts (not shown) holding the carriage bolts 22 in the attachment brackets 17 are then tightened to secure the subassembly 12 in place on the securing plates 18 and 19. In that position, the heads of the carriage bolts 22 prevent the carriage bolts 22 from being lifted out of the keyhole slots 23 and 24 off the securing plates 18 and 19 which prevents accidental removal of the gooseneck subassembly 12 from the securing plates 18 and 19. Thus, the gooseneck subassembly 12 is able to be easily removed from the bed 14A of the truck 14 when not in use. The securing plates 18 and 19 remain in the bed 14A of the truck 14 and do not substantially interfere with the normal operation of the truck 14. In all three embodiments, the subassembly 12, the attachment brackets 17 and the securing plates 18 and 19 are preferably made of a durable metal such as steel.

The hitch ball 32 has a top portion 33 with a threaded stem 34 extending therefrom. The top portion 33 has a ball 33A and a base 33B connected therebetween by a narrow middle section 33C. The hitch ball 32 is preferably mounted on the subassembly 12 such that the threaded stem 34 extends downward through the subassembly 12 with the top portion 33 of the hitch ball 32 adjacent the top surface 12A of the subassembly 12. The hitch ball 32 is mounted such that the top portion 33 of the hitch ball B2 extends upward from the top surface 12A of the subassembly 12 opposite the bed 14A of the truck 14. A nut 35 and a washer B6 are placed opposite the top surface 12A of the subassembly 12 over the stem 34 extending through the subassembly 12 to secure the hitch ball 32 on the subassembly 12 (FIG. 3). Preferably, the hitch ball 32 is similar to standard hitch balls well known in the prior art. However, the fifth wheel assembly 10 is easily adapted to be mounted on many other prior art hitch ball assemblies well known in the prior art.

Figure 5:
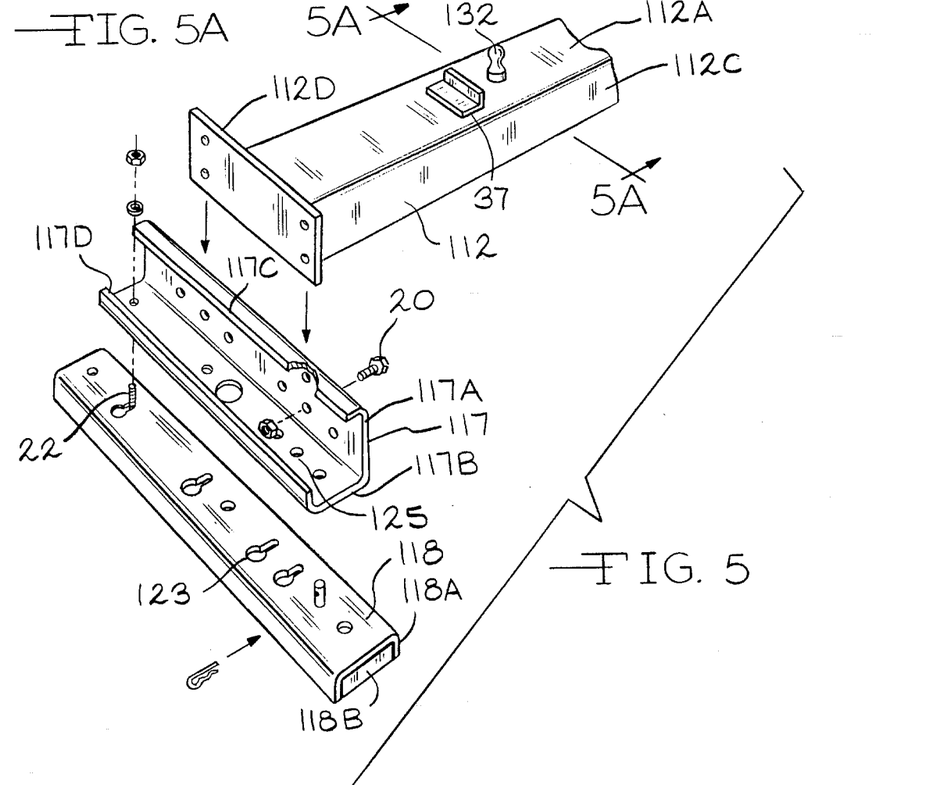
FIG. 5 is a partial perspective view of a first alternate embodiment of the gooseneck subassembly 112 showing the end plate 112D, the attachment bracket 117 and the securing plate 118.
Figures 5A, 5B:
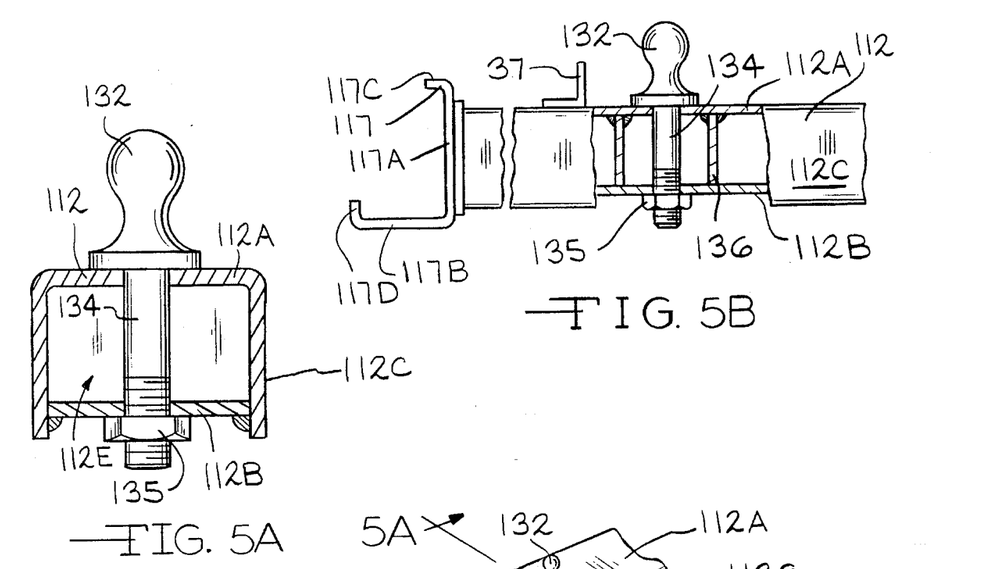
FIG. 5A is a cross-sectional view of the alternate gooseneck subassembly 112 of FIG. 5 along the line 5A—5A showing the upper portion 112A and the bottom plate 112B of the alternate gooseneck subassembly 112.
FIG. 5B is a cut away view of the alternate gooseneck subassembly 112 of FIG. 5 showing the reinforcing inserts 136 on opposed sides of the hitch ball 132.

In a first alternate embodiment as shown in FIGS. 5, 5A and 5B, the first alternate gooseneck subassembly 112 consists of a U-shaped upper portion 112A and a bottom plate 112B (FIG. 5A). The bottom plate 112B is mounted between the legs 112C of the upper portion 112A such as to form a rectangular shaped opening 112E through the first alternate gooseneck subassembly 112. The bottom plate 112B is preferably welded onto the upper portion 112A. The hitch ball 132 is mounted on the subassembly 112 such that the threaded stem 134 extends through the U-shaped upper portion 112A and the bottom plate 112 of the first alternate gooseneck subassembly 112. A nut 135 is placed on the threaded stem 134 adjacent the bottom plate 112 of the subassembly 112 on the side opposite the rectangular opening 112E. In addition as shown in FIG. 5B, a pair of reinforcing inserts 136 are mounted in the rectangular opening 112E of the first alternate gooseneck subassembly 112 on either side of the hitch ball 132. The reinforcing inserts 136 increase the strength of the first alternate gooseneck subassembly 112 and keep the U-shaped upper portion 112A of the first alternate gooseneck subassembly 112 from deforming during towing.

The first alternate gooseneck subassembly 112 has end plates 112D (one shown) which are similar to those of the preferred embodiment and are similarly mounted onto attachment brackets 117 (one shown) using identical nut and bolt pairs 20 (FIG. 5). The attachment brackets 117 differ from those of the preferred embodiment in that the opposed sides of the first and second legs 117A and 117B of the attachment brackets 117 have lips 117C and 117D. The first leg 117A has a lip 117C on the side opposite the second leg 117B which extends outward perpendicular to the first leg 117A and away from the end plate 112D of the alternate gooseneck subassembly 112. The second legs 117B likewise has a lip 117C on the side opposite the first leg 117A extending upward, perpendicular to the second leg 117B and away from the securing plate 118. The added lips 117C and 117D of the attachment brackets 117 add strength to the brackets 117. In addition, each of the second legs 117B of the attachment brackets 117 have an additional hole 125 to accommodate an additional carriage bolt 22. The securing plates 118 also have an additional keyhole slot 123 for mounting of the additional carriage bolt 22. The carriage bolts 22 of the first alternate embodiment are preferably identical to those of the preferred embodiment. The addition of a fourth carriage bolt 22 provides further securing force to better secure the subassembly 112 on the securing plates 118 (one shown). The securing plates 118 of the second alternate embodiment are of a different shape than the securing plates 18 and 19 of the preferred embodiment. The securing plates 118 of the first alternate embodiment have a U-shape or channel shape. The securing plates 118 are mounted onto the bed 14A of the truck 14 such that the legs 118A of the securing plates 118 extend downward toward the bed 14A of the truck 14. The spacers 118B fit between the legs 118A of the securing plates 118 and allow for securely mounting the securing plates 118 onto the bed 14A of the truck 14. The spacers 118B are of such a height as to fit closely beneath the securing plate 118 while allowing the legs 118A of the securing plates 118 to be in contact with the bed 14A of the truck 14. The mounting of the attachment brackets 117 onto the securing plates 118 is similar to that of the preferred embodiment except for the additional carriage bolts 22. The construction of the first alternate embodiment increases the strength of the first alternate gooseneck subassembly 112 and provides for more secure mounting of the gooseneck subassembly 112 in the bed 14A of the truck 14.

Figure 6:
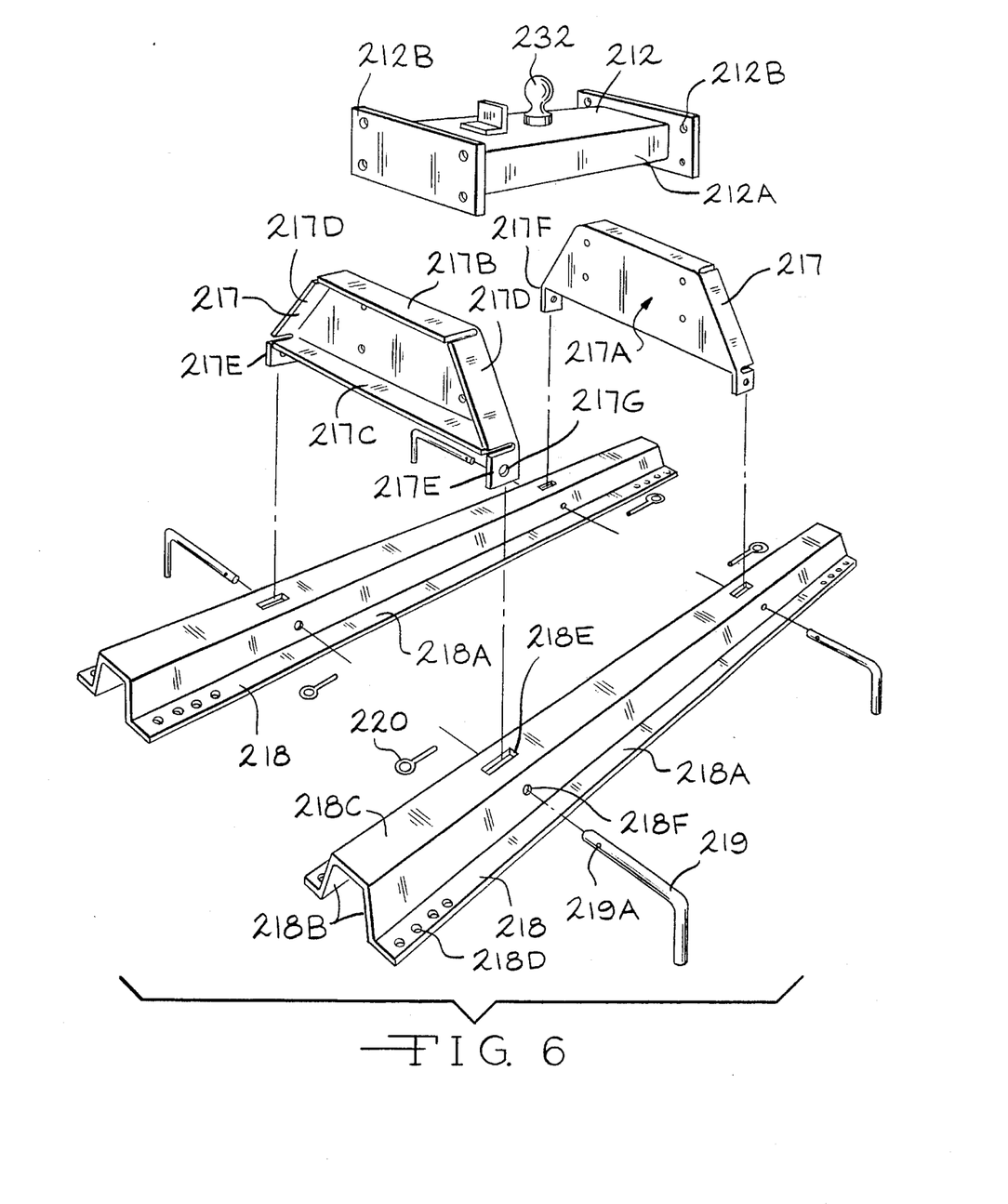
FIG. 6 is a front perspective view of a second alternate embodiment of the gooseneck subassembly 212 showing the end plates 212B, attachment brackets 217 and securing rails 218.

As shown in FIG. 6, the second alternate embodiment has a second alternate subassembly 212 which is mounted by attachment brackets 217 onto securing rails 218 which are mounted in the bed 14A of the pickup truck 14. The second alternate subassembly 212 is similar to the first alternate subassembly 112 and has a U-shaped upper portion 212A and a bottom plate (not shown). The bottom plate and the hitch ball 232 are mounted similarly to the bottom plate 112B and hitch ball 132 of the first alternate embodiment. The second alternate subassembly 212 has end plates 212B which are mounted by nut and bolt pairs (not shown) onto the attachment brackets 217. The attachment brackets 217 of the second alternate embodiment are different from those of the preferred and first alternate embodiments. The attachment brackets 217 of the second alternate embodiment has a face plate 217A with a top lip 217B, bottom lip 217C and two side lips 217D formed around the perimeter of the face plate 217A. The face plate 217A is shaped like a triangle with the apex of the triangle cut off. The top lip 217B is preferably adjacent the cut off apex of the triangular face plate 217A while the bottom lip 217C is adjacent the base of the triangular face plate 217Z. The lips 217B, 217C and 217D extend outward perpendicular to the face plate 217A. The face plate 217A and the lips 217B, 217C and 217D are constructed from a unitary piece of sheet metal. The attachment brackets 217 also have mounting extensions 217E which extend downward from the lower corners 217F, perpendicular to the bottom lip 217C of the attachment bracket 217. The extensions 217E are provided with apertures 217G which allow for insertion of the securing rods 219 (to be described in detail hereinafter). The attachment brackets 217 are mounted onto securing rails 218 which are secured onto the bed 14A of the truck 14. The securing rails 218 are U-shaped with a flange 218A extending outward at the end of each leg 218B opposite the top 218C of the rail 218. The rails 218 are mounted in the bed 14A of the truck 14 spaced apart and parallel to each other and parallel to the rear axle 16 of the truck 14. The rails 218 are mounted such that the flanges 218A are adjacent the bed 14A of the truck 14 with the legs 218B of the rails 218 extending upward toward the top 218C of the rail 218. The rails 218 are fastened to the bed 14A of the truck 14 by nut and bolt pairs (not shown) which mount through apertures 218D in the flanges 218A of the rails 218. There are preferably four (4) apertures 218D in each flange 218A at each end of the rail 218 such that a total of sixteen (16) nut and bolt pairs can be used to secure each rail 218 to the bed 14A of the truck 14. The top 218C of the rails 218 are provided with slots 218E for mounting of the extensions 217E of the attachment brackets 217. Preferably, there are two slots 218E in the top 218C of each rail 218. Each slot 218E is preferably spaced inward from the adjacent end the same distance such that when correctly mounted, the second alternate subassembly 212 is centered along the length of the rails 218. The slots 218E necessarily have to be similarly positioned on each rail 218 in order to allow for correct mounting of the attachment brackets 217 and thus the subassembly 212. The legs 218B of the rails 218 are provided with apertures 218F spaced directly below the slots 218E and extending through the legs 218B perpendicular to the slots 218E. Securing rods 219 are provided to extend through the apertures 218F in the legs 218B of the rails 218 for securing the extension 217E of the attachment brackets 217 in the slots 218E in the rails 218. Hairpin keepers 220 extend through holes 219A in the end of the securing rods 219 for holding the rods 219 in place in the rails 218. The securing rods 219 are preferably similar to the securing rods 52 used to secure the adaptor 42 onto the bearings 39 (to be described in detail hereinafter). To secure the second alternate subassembly 212 onto the bed 14A of the truck 14, the rails 218 are first mounted onto the bed 14A of the truck 14. Next, the attachment brackets 217 are mounted such that the extensions 217E are mounted such that the extensions 217E extend through the slots 218E in the top 218C of the rails 218 and are secured in place by the securing rods 219 which are inserted into the aperture 218F in one leg 218B of the rail 218 then through the aperture 217G in the extension 217E and finally, through the aperture 218F in the opposed leg 218B of the rail 218 where the hairpin keeper 220 is inserted into the securing rod 219. The attachment brackets 217 are mounted such that the face plates 217A are adjacent and parallel and spaced apart. Finally, the end plates 212B of the second alternate subassembly 212 are mounted onto the face plates 217A of the attachment brackets 217 such as to extend between the attachment brackets 217. The rails 218 are preferably situated such that the second alternate subassembly 212 extends parallel to the rear axle 16 of the truck 14 and is either directly above or slightly forward of the rear axle 16. The construction of this embodiment allows the second alternate subassembly 212 to be shorter than the subassembly 12 and 112 of the other embodiments. The shorter second alternate subassembly 212 allows less material to be used thus, lowering the cost of the subassembly 212 while continuing to provide the necessary strength for towing a vehicle.

The remaining structure of the fifth wheel hitch assembly is preferably similar for all three embodiments of the subassembly 12, 112 and 212. Therefore, only the remaining structure of the preferred embodiment will be described in detail. The hitch ball 32 of the subassembly 12 is preferably mounted between the spaced apart ends 12B of the subassembly 12. To provide optimal performance and to balance the load of the towed trailer (not shown), the hitch ball 32 is preferably spaced equally apart from each end 12B in the center of the subassembly 12. Thus, the center axis A—A of the fifth wheel hitch assembly 10 as determined by the hitch ball 32 is centered over and concentric with the center axis B—B of the axle differential housing 58 of the rear axle 16 of the truck 14 (FIG. 3). In an alternate embodiment, the subassembly 12 is spaced slightly forward of the rear axle 16 of the truck 14. Consequently, the center vertical axis (not shown) of the fifth wheel hitch assembly 10 is spaced slightly forward of and aligned with the center axis B—B of the center of the axle differential housing 58 of the rear axle 16 of the truck 14.

A stopper 37 is positioned on the top surface 12A of the subassembly 12 adjacent to and spaced apart from the hitch ball 32. Preferably, the stopper 37 is L-shaped and is mounted such that the first leg 37A of the stopper 37 is adjacent and parallel to the top surface 12A of the subassembly 12 and extends away from the hitch ball 32 and the second leg 37B extends upward perpendicular to the top surface 12A of the subassembly 12, spaced apart from the hitch ball 32. The stopper 37 is preferably spaced apart from the hitch ball 32 such that the adaptor 42 and the complete bearing 38 (to be described in detail hereinafter) are able to be mounted on the hitch ball 32 with the sidewall 42C of the adaptor 42 slightly spaced apart from the stopper 37, such that the stopper 37 allows movement and tilting of the adaptor 42 and the complete bearing 38 on the hitch ball 32 while preventing extraneous side-to-side movement and/or rotational motion of the adaptor 42 and the complete bearing 38 on the hitch ball 32. The stopper 37 is preferably constructed of steel and is welded onto the top surface 12A of the subassembly 12.

In the preferred embodiment as shown in FIG. 2, the complete bearing 38 consists of a pair of half-shell bearings 39 which are positioned together to form the complete bearing 38. Alternately, the complete bearing 38 is constructed from several partial shell bearings (not shown) which are positioned together to form the complete bearing 38. Preferably, the half-shell bearings 39 each have a top 39A and a bottom 39B with an inner wall 39C and an outer wall 39D extending therebetween. Each of the half-shell bearings 39 is preferably rectangular in shape such that when the half-shell bearings 39 are paired together with their inner walls 39C adjacent, the paired rectangular half-shell bearings 39 form the complete bearing 38 which has a square shape as defined by the outer walls 39D of the half-shell bearings 39. The half-shell bearings 39 each have an indention 39E in their inner wall 39C. The indentions 39E have a shape similar to the hitch ball 32 with an upper portion 39F, a lower portion 39G and a narrower center portion 39H. The half-shell bearings 39 are identical such that when the inner walls 39C of the bearings 39 are moved together with their tops 39A and bottoms 39B matching the indentions 39E form a complete cavity 38A in the complete bearing 38. The complete cavity 38A in the complete bearing 38 has the same shape as the hitch ball 32. In the preferred embodiment, when the bearings 39 are moved onto either side of the hitch ball 32, the indentations 39E enable the bearings 39 to be positioned such as to completely surround the hitch ball 32 (FIG. 3). Preferably, when the bearings 39 are mounted around the hitch ball 32 mounted on the subassembly 12, the complete bearing 38 is spaced above the top surface 12A of the subassembly 12 and does not touch the subassembly 12. The halt-shell bearings 39 are preferably of a height such as to extend from the base 33B of the top portion 33 of the hitch ball 32 upward beyond the ball 33A of the top portion 33 of the hitch ball 32. The half-shell bearings 39 preferably have a height of 3.50 inches (8.89 cm) and are spaced 1.00 inches (2.54 cm) above the top surface 12A of the subassembly 12 when mounted on the hitch ball 32 such that the complete bearing 38 extends beyond the hitch ball 32 approximately 0.38 inches (0.97 cm). This added height provides the necessary distance and padding between the adaptor 42 and the hitch ball 32 to allow movement of the fifth wheel hitch assembly 10 on the hitch ball 32. The half-shell bearings 39 also have a width of 3.50 inches (8.89 cm) and a depth of 1.75 inches (4.45 cm) such that when the two half-shell bearings 39 are placed together., the pair of bearings 39 form the complete bearing 38 with a size of 3.50×3.50 ×3.50 inches (8.89×8.89×8.89 cm). The size of the complete bearing 38 allows for an average thickness of 0.45 inches (1.14 cm) around the entire top portion 33 of the hitch ball 32.

Each of the half-shell bearings 39 has an aperture 40 extending through the bearings 39 on either side of the narrower center portion 39H of the indention 39E below the upper portion 39F of the indention 39E. Preferably, when the half-shell bearings 39 are positioned on the hitch ball 32, the apertures 40 run perpendicular to the length of the subassembly 12 (FIG. 3). In the preferred embodiment, the bearings 39 are constructed of a polymer, which is comprised of urethane which enables the complete bearing 38 to be flexible. Alternately, the bearings 39 are constructed from a tough plastic such as polyurethane or other similar synthetic polymer products with suitable flexibility and durability. The bearings 39 can be constructed with the adaptor 42 as a unitary piece and can also be made of metal in which case a lubricant would be used between the complete bearing 38 and the adaptor 42 to reduce friction between the parts during towing. A lubricant (not shown) can also be used in the preferred embodiment to reduce friction between the complete bearing 38 and the adaptor 42.

The adaptor 42 has a front wall 42A, a back wall 42B and two sidewalls 42C forming an opening 44 extending between an open top (not shown) and an open bottom 42E. The adaptor 42 and the opening 44 of the adaptor 42 are preferably similar in shape to the complete bearing 38. Preferably, the adaptor 42 is constructed of a 4.0 inch (10.2 cm) steel square pipe. The fifth wheel head 46 of the fifth wheel hitch assembly 10 is mounted to the open top of the adaptor 42 such that the adaptor 42 extends downward from the bottom 46A of the fifth wheel head 46 (FIG. 3). Preferably, the fifth wheel head 46 is also constructed of steel and is permanently welded onto the top of the adaptor 42 such as to completely cover the open top of the adaptor 42. The fifth wheel head 46 of the fifth wheel hitch assembly 10 preferably utilizes a coupling device 48 for engaging the trailer kingpin 49 similar to a miniaturized version of a semi-tractor trailer hitch wheel which is similar to those well-known in the prior art (FIG. 3). The adaptor 42 has a pair of holes 50 in the front and back walls 42A and 42B extending parallel to the sidewalls 42C of the adaptor 42. The pair of the holes 50 in the front wall 42A are preferably aligned with the pair of holes 50 in the back wall 42B, such as to provide two complete holes 50 through the adaptor 42 perpendicular to the opening 44. Preferably, the holes 50 are positioned such that when the adaptor 42 is mounted on the complete bearing 38 on the hitch ball 32 with the fifth wheel head 46 facing forward, each pair of holes 50 of the adaptor 42 is aligned with one of the apertures 40 of the half-shell bearing 39.

The securing rods 52 preferably have a cylindrical shape with spaced apart first and second ends 52A and 52B. The first end 52A of each rod 52 preferably has a slight bend and the second end 52B of each rod 52 preferably has a hole 54 extending through the second end 52B perpendicular to the length of the rod 52. The securing rods 52 preferably have a diameter slightly smaller than the diameter of the holes 50 of the adaptor 42 and the apertures 40 of the half-shell bearings 39. A pair of hairpin keepers 56 are provided to extend through the holes 54 in the second ends 52B of the securing rods 52. Preferably, the securing rods 52 have a 0.75 inches (1.91 cm).

IN USE

In the preferred embodiment, the gooseneck subassembly 12 is securely attached to the attachment brackets 17 which are removably attached onto the securing plates 18 and 19 mounted in the bed 14A of the truck 14. Preferably, the subassembly 12 is mounted such that the hitch ball 32 which is mounted in the center of the subassembly 12, is directly over the rear axle 16 of the truck 14. Thus, in trucks 14 having rear wheel drive, the hitch ball 32 is preferably over the center of the axle differential housing 58 of the rear axle 16 of the truck 14 such that the center axis A—A of the hitch ball 32 is aligned with the center of the axle differential housing 58 (FIG. 3). The positioning of the hitch ball 32 such that the center axis A—A of the hitch ball 32 is directly over the center or concentric with the vertical center axis B—B of the axle differential housing 58 of the rear axle 16 of the truck 14 ensures that the kingpin 49 when mounted in the fifth wheel hitch head 46 is also directly over the center of the axle differential housing 58 which enables the fixed mounting point to be as near as possible to the centerline of the rear axle 16 of the truck 14. This provides for easier towing by equally distributing the towing load on the rear axle 16 of the truck 14. Alternately, the subassembly 12 can be mounted slightly forward of the rear axle 16 of the truck 14. The center axis A—A of the hitch ball 32 is still aligned with although forward of the center of the axle differential housing 58 of the rear axle 16 of the truck 14 and thus, the mounting point is still aligned with the centerline of the rear axle 16 of the truck 14. In a further embodiment, the subassembly 12 can be mounted slightly behind the rear axle 16 of the truck 14 with the center axis A—A of the hitch ball 32 still aligned with the center axis B—B of the axle differential housing 58 of the rear axle 16 of the truck 14.

To mount the fifth wheel hitch assembly 10 on the gooseneck subassembly 12, the half-shell bearings 39 are first moved into position around the hitch ball 32. The half-shell bearings 39 are located such that the inner walls 39C of the bearings 38 are adjacent to and in contact with the hitch ball 32 and completely surround the hitch ball 32. Thus, the cavity 38A of the complete bearing 38 holds the hitch ball 32. When the half-shell bearings B9 are correctly positioned around the hitch ball 32, the apertures 40 of the half-shell bearings 39 are preferably perpendicular to the length of the subassembly 12 and the rear axle 16 of the truck 14. Next, the adaptor 42 with the fifth wheel head 46 firmly attached, is mounted on the complete bearing 38 and hitch ball 32. The adaptor 42 holds the half-shell bearings 39 together in position on the hitch ball 32. When correctly positioned on the hitch ball 32, the adaptor 42 is located such that the complete bearing 38 is within the opening 44 of the adaptor 42 and the bottom 42E of the adaptor 42 is adjacent to and spaced above the top surface 12A of the subassembly 12. Preferably, when fully in place, the tops 39A of the half-shell bearings 39 are spaced slightly above the open top of the adaptor 42 such as to be in contact with the fifth wheel head 46.

Once the adaptor 42 with the fifth wheel head 46 is in place on the complete bearing 38, the securing rods 52 are inserted into the holes 50 in the front wall 42A of the adaptor 42 through the apertures 40 of the half-shell bearings 39 and out through the holes 50 in the back wall 42B of the adaptor 42 (FIG. 4). The securing rods 52 are preferably in positions such that when fully inserted, the first ends 52A of the securing rods 52 are adjacent the front wall 42A of the adaptor 42 and the second ends 52B of the securing rods 52 extend outward beyond the back wall 42B of the adaptor 42. The hairpin keepers 56 are then inserted through the holes 54 in the second ends 52B of the securing rods 52 to ensure that the second ends 52B of the securing rods 52 do not slip out of the holes 50 of the adaptor 42 and the apertures 40 of the complete bearings 38. The bent first ends 52A of the securing rods 52 prevent the securing rods 52 from extending completely through the holes 50 and the apertures 40 in the other direction. The bent first ends 52A of the securing rods 52 also prevent the securing rods 52 from extending beyond the subassembly 12 which reduces the possibility of accidental injury, due to contact with the first end 52A of the securing rods 52 extending beyond the subassembly 12. The apertures 40 in the bearings 39 are positioned on either side of the narrow, center portion 39H of the indention 39E such that when the securing rods 52 are fully in place, the securing rods 52 are adjacent the middle 33C of the hitch ball 33 and below the enlarged ball 33A of the hitch ball 33. Thus, the securing rods 52 act to hold the adaptor 42 and the bearings 39 on the hitch ball 33. The space between the securing rods 52 when mounted in the adaptor 42 is smaller than the width of the ball 33A of the hitch ball 33 and consequently, the securing rods 52 are unable to move upward past the ball 33A while held in position by the adaptor 42 and the bearings 39. The securing rods 52 and the bearings 39 hold the adaptor 42 with the fifth wheel head 44 on the hitch ball 33 (FIG. 4).

The mounting of the adaptor 42 on the complete bearing 38 surrounding the hitch ball 32, allows the fifth wheel hitch assembly 10 to list or tilt in virtually any direction on the hitch ball 32 without imparting the same twisting action to the towed trailer. The fifth wheel hitch assembly 10 has a full range of movement about a fixed mounting point by embodying a ball and socket concept using the hitch ball 32 as the ball portion and the complete cavity 38A of the bearing 38 as the socket portion. The full range of movement inherent in the ball and socket concept allows the fifth wheel hitch assembly 10 to easily couple and uncouple, to and from the kingpin 49 of the trailer without becoming bound up or jammed. This eliminates a common problem with most fifth wheel systems caused when the trailer sets on unlevel ground (from side to side) relative to the towing vehicle. The fifth wheel hitch assembly 10 is free to oscillate about the center of the hitch ball 32 while at the same time constrained by the amount of flex incorporated in the complete bearing 38. Also, due to the resilience of the complete bearing 38, the fifth wheel hitch assembly 10 when coupled to a towed trailer, provides shock absorption and cushioning action which greatly reduces or even eliminates the jerking action inherent in most towing systems. The complete bearing 38 allows movement of the fifth wheel hitch assembly 10 easily in any direction with minimal friction between the adaptor 42 and the hitch ball 32. Thus, the complete bearing 38 acts as a damping system as well as a mount. In addition, due to the resilience of the complete bearing 38, the fifth wheel hitch assembly 10 will return to its original upright position when uncoupled, thus, eliminating the need for the user to hold the fifth wheel head 46 and coupling device 48 in the upright position when re-coupling. The fifth wheel hitch head 46 with the adaptor 42 and complete bearing 38 enables a gooseneck subassembly 12 to be converted into a fifth wheel hitch assembly 10 and vice versa with very little time and effort. In addition, the converted fifth wheel hitch assembly 10 has the added benefit of a resilient mounting, which counteracts the effects of tilting and listing of the fifth wheel hitch assembly 10 which is not available in conventional fifth wheel assemblies. The tiltability of the fifth wheel hitch assembly 10 provided by the flexibility of the bearing 38 and the mounting of the fifth wheel hitch assembly 10 on the hitch ball 32 of the gooseneck subassembly 12 prevents the connection between the coupling device 48 of the fifth wheel hitch assembly 10 and kingpin 49 of the trailer from becoming bound up or jammed. Thus, the tiltability of the fifth wheel assembly 10 allows for ease of engagement and disengagement to and from the trailer during coupling and uncoupling of the kingpin 49 from the coupling device 48 of the fifth wheel head 46, even when the trailer is positioned on an uneven ground surface. In addition, the resilience of the complete bearing 38 biases the fifth wheel hitch assembly 10 back to its original upright position when uncoupled which eliminates the need for the user to hold the fifth wheel head 46 and coupling device 48 in the upright position when re-coupling.

Numerous variations will occur to those skilled in the art. It is intended that the foregoing description be only illustrative of the present invention and that the present invention be limited only by the hereinafter appended claims.

I claim:

1. An apparatus for providing a fifth wheel hitch connection with a hitch ball, which comprises:
   (a) a pair of half-shell bearings each having a concave indention mountable on and conforming to the hitch ball wherein the concave indentions are positioned together to form a complete cavity for holding the hitch ball when the half-shell bearings are positioned together around the hitch ball and each of the bearings having outer walls around the cavity;
   (b) an adaptor having an opening which is mounted on the outer walls of the bearings so that the bearings are secured on the hitch ball wherein the bearings provide for mounting of the adaptor on the hitch ball;
   (c) securing means for securing the adaptor on the bearings when mounted on the hitch ball; and
   (d) a fifth wheel hitch assembly mounted on an end of the adaptor above the cavity and above the hitch ball.

2. The apparatus of claim 1 wherein the indentions of the half-shells have an upper portion and a lower portion connected by a narrower middle portion which conforms to the shape of the hitch ball.

3. The apparatus of claim 2 wherein the securing means are rods which extend through apertures in the bearings and the adaptor and wherein the apertures are below the upper portion of the indentions of the bearings adjacent the narrower middle portion so that the rods prevent the adaptor from lifting off the hitch ball.

4. The apparatus of claim 1 wherein the securing means is a pair of rods with opposed ends and wherein the rods each extend through first apertures in a first side of the adaptor through the bearings and through second apertures in a second side of the adaptor for securing the adaptor to the hitch ball.

5. The apparatus of claim 4 wherein the ends of the rods adjacent the first side of the adaptor are bent in order to prevent the rods from slipping completely through the first apertures in the first side of the adaptor.

6. The apparatus of claim 4 wherein the rods are secured in the adaptor and the bearings by hairpin keepers extending through holes in the end of the rods adjacent the second side of the adaptor.

7. The apparatus of claim 1 wherein the bearings are constructed of a resilient material which acts to bias the fifth wheel hitch assembly into the upright position after uncoupling of a towed vehicle.

8. The apparatus of claim 1 wherein the bearings are constructed from a tough plastic material.

9. The apparatus of claim 1 wherein the outer walls of the pair of half-shell bearings have a rectangular box shape.

10. The apparatus of claim 1 wherein the opening of the adaptor has a rectangular shape which conforms to the outer walls of the bearings.

11. The apparatus of claim 10 wherein the opening of the adaptor is slightly larger than the outer walls of the bearings to enable the adaptor to be snugly mounted on the bearings.

12. An apparatus for providing a fifth wheel hitch connection on a vehicle, which comprises:
    (a) a hitch bar having a hitch ball mounted on the vehicle;
    (b) a pair of half-shell bearings each having a concave indention mountable on and conforming to the hitch ball wherein the concave indentions are positioned together to form a complete cavity for holding the hitch ball when the half-shell bearings are positioned together around the hitch ball and each of the bearings having outer walls around the cavity;
    (c) an adaptor having an opening which is mounted on the outer walls of the bearings so that the bearings are secured on the hitch ball wherein the bearings provide for mounting of the adaptor on the hitch ball;
    (d) securing means for securing the adaptor on the bearings when mounted on the hitch ball; and
    (e) a fifth wheel hitch assembly mounted on an end of the adaptor above the cavity and above the hitch ball.

13. The apparatus of claim 12 wherein the hitch bar is removably mounted on the vehicle.

14. The apparatus of claim 12 wherein the vehicle is a pickup truck and wherein the hitch bar is mounted in a bed of the truck parallel to a rear axle of the truck.

15. The apparatus of claim 12 wherein the hitch ball is mounted on the hitch bar equally spaced between opposed ends of the hitch bar.

16. The apparatus of claim 12 wherein the hitch bar is mounted in the bed of the truck directly above the rear axle of the truck.

17. The apparatus of claim 16 wherein a vertical axis of the hitch ball is concentric with a center of a rear axle differential housing of the rear axle of the truck.

18. The apparatus of claim 12 wherein the hitch bar is mounted in the bed of the truck spaced slightly forward of the rear axle of the truck.

19. The apparatus of claim 17 wherein a vertical axis of the hitch ball is aligned with and spaced slightly forward of a center of a rear axle differential housing of the rear axle of the truck.

20. The apparatus of claim 12 wherein a stopper means is mounted on the hitch bar adjacent the hitch ball so that the stopper means prevents rotation of the adaptor on the hitch bar.

21. The apparatus of claim 20 wherein the stopper means is a steel angle bracket.

22. A method for providing a fifth wheel hitch connection on a hitch ball mounted on a vehicle, which comprises:
    (a) mounting a pair of resilient half-shell bearings on the hitch ball each bearing having a concave indention conforming to the hitch ball, wherein the concave indentions are positioned together to form a complete cavity for holding the hitch ball when the half-shell bearings are moved together around the hitch ball and each of the bearings having outer walls around the cavity;
    (b) mounting a fifth wheel hitch with an adaptor having an opening on the outer walls of the bearings so that the bearings are secured on the hitch ball wherein the bearings provide for mounting of the adaptor and fifth wheel hitch on the hitch ball; and
    (c) securing the adaptor on the bearings and the hitch ball.

23. The method of claim 22 wherein step (b) includes securing the adaptor on the bearings and the hitch ball by a securing means which is used to connect the bearings and the adaptor together.

24. The method of claim 23 wherein the adaptor has first apertures in a first side and second apertures in an opposed second side, each of the bearings has a hole extending through the bearing and the securing means is a pair of rods with opposed ends and wherein the rods are each extended into the first apertures in the first side of the adaptor through the hole in each of the bearings and through the second apertures in the second side of the adaptor such that the rods extend from the first side of the adaptor through the bearings to the second side of the adaptor for connecting the bearings and the adaptor together.

25. The method of claim 24 wherein the indentions of the half-shell bearings conform to the shape of the hitch ball and have an upper portion and a lower portion connected by a narrower middle portion and the apertures of the adaptor are below the upper portion of the indentions adjacent the narrower middle portion and wherein the rods, which are extended through the apertures in the adaptor and the holes in the bearings, the rods prevent the adaptor from lifting off the hitch ball.

26. A method for mounting a fifth wheel hitch on a vehicle, which comprises:

(a) mounting a hitch bar means having a hitch ball on the vehicle;

(b) mounting a pair of half-shell bearings on the hitch ball each bearing having a concave indention conforming to the hitch ball, wherein the concave indentions are positioned together to form a complete cavity for holding the hitch ball when the half-shell bearings are moved together around the hitch ball and each of the bearings having outer walls around the cavity;

(c) mounting a fifth wheel hitch with an adaptor having an opening which is mounted on the outer walls of the bearings so that the bearings are secured on the hitch ball, wherein the bearings provide for mounting of the adaptor and fifth wheel hitch on the hitch ball; and (d) securing the adaptor on the bearings and the hitch ball.

27. An apparatus for providing a fifth wheel hitch connection with a hitch ball, which comprises:

(a) shell bearings having a concave indention mountable on and conforming to the hitch ball wherein the concave indentions are positioned together to form a complete cavity for holding the hitch ball when the shell bearings are positioned together around the hitch ball and each of the shell bearings having outer walls around the cavity;

(b) an adaptor having an opening which is mounted on the outer walls of the bearings so that the bearings are secured on the hitch ball wherein the bearings provide for mounting of the adaptor on the hitch ball;

(c) securing means for securing the adaptor on the bearings when mounted on the hitch ball; and (d) a fifth wheel hitch assembly mounted on an end of the adaptor above the cavity and above the hitch ball.

28. A method for providing a fifth wheel hitch connection on a hitch ball mounted on a vehicle, which comprises:

(a) mounting resilient shell bearings on the hitch ball each bearing having a concave indention conforming to the hitch ball, wherein the concave indentions are positioned together to form a complete cavity for holding the hitch ball when the shell bearings are moved together around the hitch ball and each of the bearings having outer walls around the cavity;

(b) mounting a fifth wheel hitch with an adaptor having an opening on the outer walls of the bearings so that the bearings are secured on the hitch ball wherein the bearings provide for mounting of the adaptor and fifth wheel hitch on the hitch ball; and (c) securing the adaptor on the bearings and the hitch ball.

29. A combination gooseneck and fifth wheel hitch connection, which comprises:

(a) a gooseneck subassembly having opposed ends with a hitch ball mounted between the opposed ends of the subassembly;

(b) a pair of half-shell bearings each having a concave indention mountable on and conforming to the hitch ball wherein the concave indentions are positioned together to form a complete cavity for holding the hitch ball when the half-shell bearings are positioned together around the hitch ball and each of the half-shell bearings having outer walls around the cavity;

(c) an adaptor having an opening which is mounted on the outer walls of the bearings so that the bearings are secured on the hitch ball wherein the bearings provide for mounting of the adaptor on the hitch ball;

(d) securing means for securing the adaptor on the bearings when mounted on the hitch ball; and (e) a fifth wheel hitch assembly mounted on an end of the adaptor above the cavity and above the hitch ball.

30. The combination of claim 29 wherein the subassembly is removably mounted in a bed of a pickup truck.

31. The combination of claim 30 wherein the subassembly is aligned with a rear axle of the pickup truck with the ends of the subassembly adjacent each wheel well of the pickup truck.

32. The combination of claim 30 wherein the subassembly is parallel to and slightly forward of a rear axle of the pickup truck with the ends of the subassembly adjacent each wheel well of the pickup truck.

33. The combination of claim 32 wherein the subassembly is mounted on a pair of rails secured in the bed of the pickup truck.

34. A combination gooseneck and fifth wheel hitch connection, which comprises:

(a) a gooseneck subassembly having opposed ends with a hitch ball mounted between the opposed ends of the subassembly;

(b) an adaptor having an opening which is mountable on and conforms to the hitch ball for holding the hitch ball when the adaptor is mounted on the hitch ball;

(c) securing means for securing the adaptor on the hitch ball when mounted on the hitch ball; and (d) a fifth wheel hitch assembly mounted on the adaptor above the opening and above the hitch ball.

35. An apparatus for providing a fifth wheel hitch connection with a hitch ball, which comprises:

(a) an adaptor having an opening which is mountable and conforms to the hitch ball for holding the hitch ball when the adaptor is mounted on the hitch ball;

(b) securing means for securing the adaptor on the hitch ball when mounted on the hitch ball; and (c) a fifth wheel hitch assembly mounted on the adaptor above the opening and above the hitch ball.

36. An apparatus for providing a fifth wheel hitch connection on a vehicle, which comprises:

(a) a hitch bar having a hitch ball mounted on the vehicle;

(b) an adaptor having an opening which is mountable on and conforms to the hitch ball for holding the hitch ball when the adaptor is mounted on the hitch ball;

(c) securing means for securing the adaptor on the hitch ball when mounted on the hitch ball; and (d) a fifth wheel hitch assembly mounted on the adaptor above the opening and above the hitch ball.

* * * * *